US007631745B2

(12) United States Patent
Steffen et al.

(10) Patent No.: US 7,631,745 B2
(45) Date of Patent: Dec. 15, 2009

(54) APPARATUS FOR COATING OBJECTS

(75) Inventors: Volker Steffen, Herford (DE); Dietrich Rodefeld, Hilter (DE)

(73) Assignee: Werner Kammann Maschinenfabrik GmbH & Co. KG, Bunde (DE)

(*) Notice: Subject to any disclaimer, the term of this patent is extended or adjusted under 35 U.S.C. 154(b) by 484 days.

(21) Appl. No.: 11/531,412

(22) Filed: Sep. 13, 2006

(65) Prior Publication Data

US 2007/0267274 A1 Nov. 22, 2007

(30) Foreign Application Priority Data

May 16, 2006 (DE) ....................... 10 2006 023 111

(51) Int. Cl.
*B65G 17/32* (2006.01)

(52) U.S. Cl. ............................. 198/377.08; 198/689.1; 198/803.5; 198/867.14; 198/867.15

(58) Field of Classification Search .............. 198/689.1, 198/867.14, 867.15, 803.5, 377.04, 377.08, 198/DIG. 955; 271/197
See application file for complete search history.

(56) References Cited

U.S. PATENT DOCUMENTS 3,889,801 A * 6/1975 Boyer ...................... 198/689.1
5,648,140 A * 7/1997 Vaders ....................... 428/131
5,964,568 A * 10/1999 Codatto ................... 414/751.1
6,008,476 A * 12/1999 Neiconi et al. .............. 219/388
6,481,565 B1 * 11/2002 Sherwood ................ 198/689.1
6,746,015 B2 * 6/2004 Lehmann .................... 271/276
6,820,553 B2 11/2004 Steffen et al.
6,874,300 B2 * 4/2005 Di Lauretis et al. ........... 53/453
6,918,588 B2 * 7/2005 Muller ....................... 271/283
7,036,656 B2 * 5/2006 Gariglio .................. 198/689.1
7,093,705 B2 * 8/2006 Ohiro et al. ............ 198/377.08
7,182,334 B2 * 2/2007 Spence et al. ............... 271/197
7,293,770 B2 * 11/2007 Edinger ...................... 271/276
7,331,161 B2 * 2/2008 Buchko ....................... 53/432

FOREIGN PATENT DOCUMENTS

EP 0581378 10/1996

OTHER PUBLICATIONS

German Official Action dated Nov. 22, 2006 received in corresponding German Patent Application Serial No. 10 2006 023 111.2 (6 pages).

* cited by examiner

*Primary Examiner*—Douglas A Hess
(74) *Attorney, Agent, or Firm*—Grossman Tucker Perrault & Pfleger, PLLC

(57) ABSTRACT

An apparatus for coating such as printing objects transports the objects through treatment stations along a transport path using at least one transport means. The transport means is in the form of an endless flexible belt which circulates in a vertical plane and which is provided at its outer surface with holding means for the objects to be decorated. The holding means are in the form of flexible portions of plastic material which are connected to the belt. The belt and the holding means are provided with at least one opening connectable to a reduced pressure source in such a way that the reduced pressure acts on an object in the respective holding means and fixes it in its position.

39 Claims, 7 Drawing Sheets

68
68a
68b
68c
82a
82b
83
86
32b
24
76
40(50)

72a
72b
72c
72d

APPARATUS FOR COATING OBJECTS

CROSS-REFERENCES TO RELATED APPLICATIONS

This application claims the priority of German patent application Serial No 10 2006 023 111.2 filed May 16, 2006, the subject-matter of which is incorporated herein by reference.

FIELD OF THE INVENTION

The invention concerns an apparatus for coating objects, for example more particularly but not exclusively decorating objects as by printing thereon

BACKGROUND OF THE INVENTION

One form of apparatus for coating objects comprises transport means for transporting the object through treatment stations along a transport path which is linear at least on a portion of its extent, as disclosed in U.S. Pat. No. 6,082,256. Therein the transport means include screws for transporting the objects, each of which is positioned on a carriage-like holding device which is moved through the treatment stations by the screw along a particular guide configuration. That arrangement is distinguished by precise orientation of the objects to be printed upon, in relation to each respective printing mechanism, so that even in the case of multi-color printing in which a plurality of partial print images are successively applied to the object and there combine together to form an overall print image, it is possible to achieve excellent print image quality.

SUMMARY OF THE INVENTION

An object of the invention is to provide an apparatus for coating objects which on the one hand can be markedly less complicated and expensive in terms of manufacture and use but which on the other hand also permits very good quality in respect of the print image produced if required.

Another object of the invention is to provide an apparatus for coating objects, for example for applying decorative printing, which involves reduced moving masses, thereby affording enhanced operational smoothness.

Still a further object of the invention is to provide an object printing apparatus which enjoys less wear and easier replacement of the parts which do wear.

Yet a further object of the invention is to provide an object coating apparatus which is of simplified apparatus structure and operational procedure with nevertheless accuracy of coating application.

According to the invention the foregoing and other objects are attained by an apparatus for coating such as more particularly printing objects which are transported through treatment stations along a transport path using at least one transport means, wherein the transport means is in the form of an endless flexible belt which circulates in a vertical plane and which is provided at its outer surface with holding means for the objects to be decorated. The holding means are in the form of flexible portions of plastic material which are connected to the belt. The belt and the holding means are provided with at least one opening connectable to a reduced pressure source in such a way that the reduced pressure acts on an object in the respective holding means.

In preferred features the endless belt can comprise steel sheet but also other suitable material, for example organic or other plastic material or rubber, possibly reinforced by inserts, for example carbon fibers.

The portion of the belt between a feed station in which objects to be treated are placed on the belt and a removal station in which the treated objects are removed from the belt can be provided with a substantially flat feed means, arranged beneath that belt, for the reduced pressure. The belt can slide at least on portions of that reduced pressure feed means during the advance transport movement of the belt and can also be held and supported by said feed means, while another portion can preferably be moved synchronously with the belt during the transport movement of the belt. The belt can be provided with through openings, by means of which a communication is made between the feed means and the regions on the top side of the belt, in which the holding means are disposed.

The holding means can also be provided with openings in such a way that the reduced pressure is operative at least at sub-regions of the underside of a generally flat object which is disposed on the holding means.

Those openings can be formed by simple holes or similar apertures in the film representing the holding means. A preferred configuration however is one in which the holding means comprises at least two film portions or the like, which are arranged at a small spacing from each other in such a way that at least one of the openings in the belt opens in the region of that at least one spacing which forms in the holding means a depression which is covered by the object lying on the holding means. That affords a larger area at which the reduced pressure is operative, on the object, without involving additional complication and expenditure.

Further objects, features and advantages of the invention will be apparent from the description hereinafter of a preferred embodiment.

DESCRIPTION OF THE PREFERRED EMBODIMENT

Figure 1:
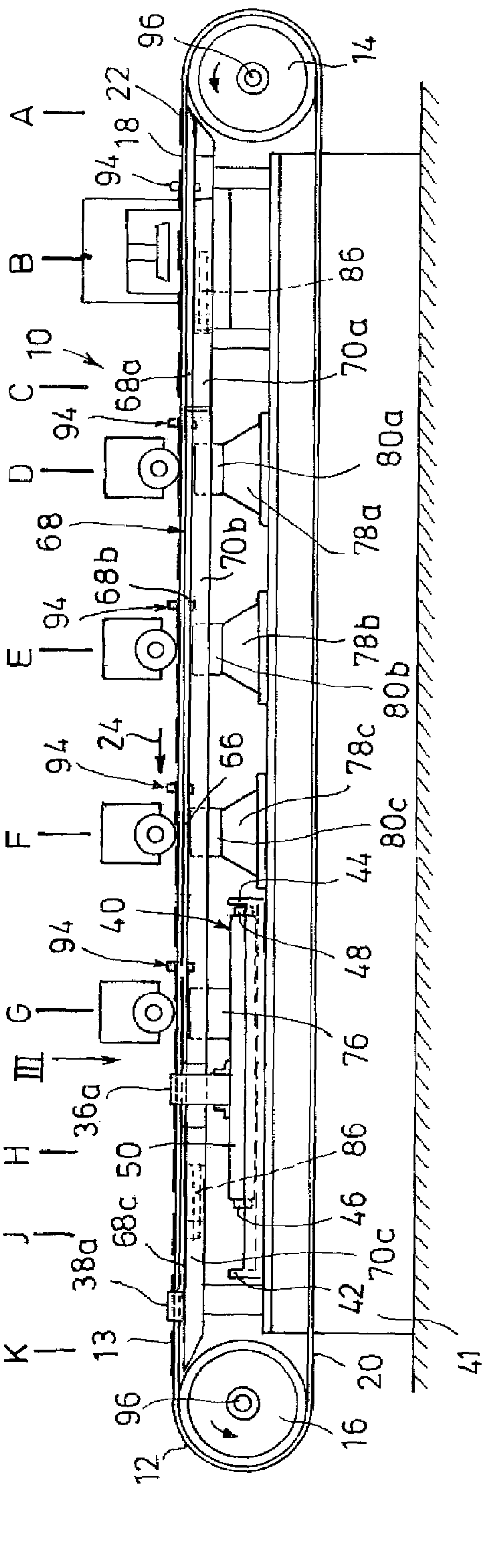
FIG. 1 is a highly diagrammatic side view of the embodiment of the invention which is preferred at the present time.

Referring firstly generally to the drawing the apparatus 10 for coating objects shown in the form of a printing machine is provided for printing on CDs, without the invention being intended to be restricted thereto.

The apparatus 10 includes a transport means in the form of an endless belt 12 which circulates in a vertical plane and which is guided in the usual manner around two guide deflection drums 14, 15 in such a way that two belt portions 18, 19 which are between the deflection drums extend substantially horizontally. Associated with the upper belt portion 18 are object treatment stations which will be described in greater detail hereinafter.

Objects 22 to be printed upon are put on to the upper belt portion 18 in a station A, at the end of the upper belt portion 18 which is associated with the deflection drum 14, and removed from the upper belt portion 18 in a station K at the end of the upper belt portion associated with the deflection drum 16, after they have been printed upon and/or treated in some other fashion, in particular coated, on their way from the first end of the upper belt portion 18 to the second end thereof. The upper belt portion 18 accordingly moves in the direction of the arrow 24.

The belt 12 can be an endless steel belt which is sufficiently flexible and which for example is of a thickness of 0.4 mm. The belt however can also comprise any other suitable material, for example plastic material, which has the required properties for example in respect of strength, flexibility and stability in respect of shape, and which can be reinforced for example by means of carbon fibers.

The belt is intended for receiving objects, typically for example CDs, and similarly shaped objects, with holding means 26 which each comprise at least one portion of a layer of soft material, for example a plastic material such as a film of polyurethane, and which are fixed preferably by means of adhesive on the side of the belt which in the upper belt portion 18 forms the upper or outer surface 27 of the belt. That means that the holding means 26 do not come into contact with the deflection drums 14, 16. In the embodiment illustrated in the drawing the holding means are of a shape which is adapted to the objects to be printed upon, in such a way that for printing on CDs they are of a substantially circular configuration and in that respect can comprise a plurality of sub-portions which are preferably in the form of a circular ring and which in their entirety together form the respective holding means. The holding means however can be of a different shape when dealing with objects of a different configuration, for example credit cards, smart cards or similar objects.

Figure 3:
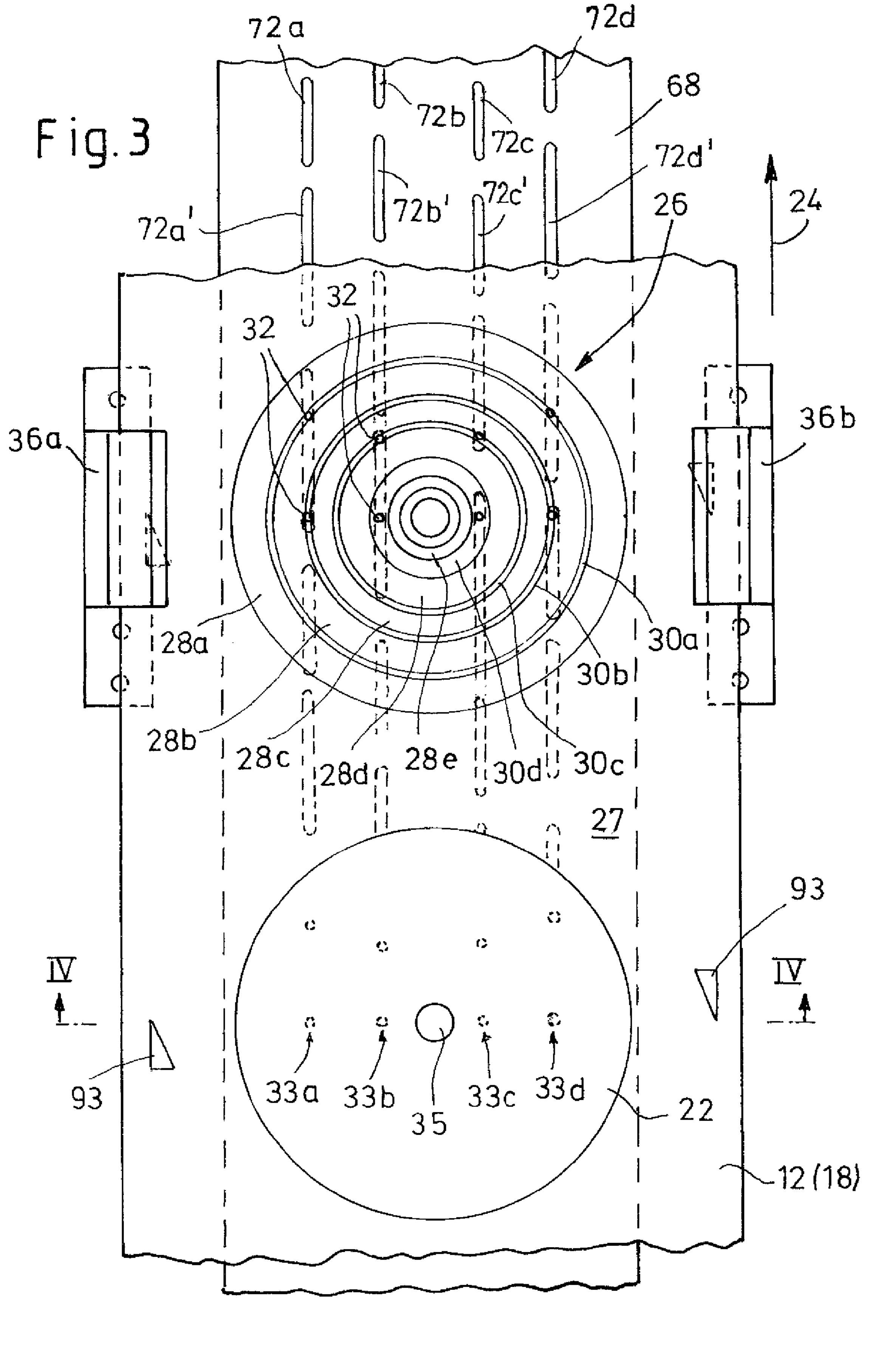
FIG. 3 shows a partial plan view approximately in the direction of the arrow III.

Looking now at FIG. 3 each holding means 26 can comprise five sub-portions 28*a*, 28*b*, 28*c*, 28*d*, 28*e* each in the form of a circular ring, which are arranged in mutually concentric relationship leaving a respective small spacing in the form of a circular ring of for example 1 mm and which are fixed by adhesive on the outer surface 27 of the belt 12 in such a way that the spacing between two adjacent holding means 26 in the direction of travel 24 of the belt is 150 mm. In the region of the spacings which form openings in the form of peripherally extending groove-like depressions 30*a*, 30*b*, 30*c*, 30*d* in the respective holding means 26, the outer surface 27 of the belt 12 is not covered. The position of the inner groove-shaped depression 30*d* is so selected that a spacer ring 31 which is mounted to the CD at the side thereof which is not to be printed upon engages into that groove-shaped depression 30*d* when the CD is lying on the holding means 26. For that reason that groove-shaped depression is also of a somewhat wider configuration. In that respect the assembly is preferably such that the spacer ring does not come into contact with the surface of the belt 12, and therefore the CD is carried exclusively or at least predominantly by the holding means 26 which is formed by the sub-portions 28*a* through 28*e*. The thickness of the holding means formed by the sub-portions 28*a* through 28*e* can be 0.36 mm although other thicknesses are possible.

In the region of the openings 30*a*, 30*b*, 30*c*, 30*d* and 30*e* which are delimited by the sub-portions 28*a* through 28*e*, small through openings 32 in the belt 12 open at the surface 27, the holes 32 being of a diameter of for example about 1 mm and communicating with a reduced pressure source in a manner to be described hereinafter. The reduced pressure which in that way is produced in the groove-shaped depressions 30*a*, 30*b*, 30*c*, 30*d*, 30*e* which are covered at the top side by the objects 22 resting on the holding means 26 and are thus closed at the top side acts on the side of the object, which is towards the belt, so that the object is pressed against the belt in the usual way by atmospheric pressure and is thereby held in its position relative to the belt 12. The configuration of the film including the arrangement of the openings for the reduced pressure thus substantially corresponds to the principle described in U.S. Pat. No. 6,820,553, the disclosure of which is hereby incorporated into this application.

As is usual with such transport belts the belt 12 can be moved by means of at least one of the two deflection drums 14, 16 which in turn is driven by an electric motor, for example and preferably a torque motor. In the illustrated embodiment the use of an electric linear motor for driving the belt 12 is preferred because in rotary printing that easily permits synchronisation of the linear movement of the object carried by the belt 12 and the rotary movement of the at least one printing cylinder whose peripheral speed should be the same as the linear speed of the object. Driving a printing machine by means of a linear motor is described in U.S. Pat. No. 6,478,485, the disclosure of which is hereby incorporated into this application.

Figure 2:
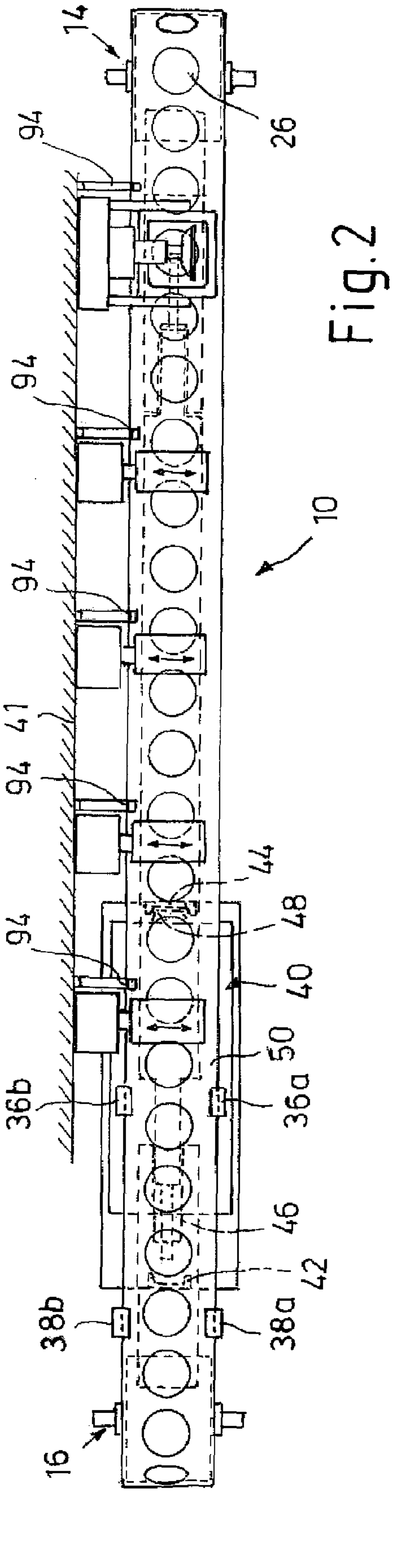
FIG. 2 shows the associated plan view of the FIG. 1 structure.

The stepwise movement of the belt is produced by the reciprocatable part of the linear motor which can be provided with magnets in order to avoid requiring a feed line for feeding electrical power to that part. Mounted to the reciprocatable part of the linear asynchronous motor is a first pair of grippers of which the two grippers 36*a*, 36*b* are arranged in mutually opposite relationship in such a way that each of the two grippers, during the advance transport movement of the belt in the direction of the arrow 24, engages an edge region of the upper belt portion 18 in order to entrain the belt 12 during the forward movement. After the conclusion of the transport step, the length of which corresponds to the spacing between two successive holding means 26, the pair of grippers 36*a*, 36*b* is released from the belt and moved back again into the starting position for the next transport step as shown in FIGS. 1 and 2, by the movable part of the linear motor.

At the beginning and at the end of each transport step, there can be an acceleration phase and a deceleration phase respectively, between which there is a motion phase taking place at a constant speed, during which the rotary printing operation can appropriately take place. Other treatment procedures, for example applying printing to the objects by means of screen printing, drying the objects and so forth, can be carried out during the stoppage phase which is between two transport steps. It is however also possible for the operation of drying the applied printing ink to be carried out for example by means of UV radiating devices during a transport step, during the belt stoppage phase or both during the transport step and also during the belt stoppage phase. Furthermore it is also possible to carry out the operation of printing on the object by means of screen printing during a transport step, in which case it will then be noted that the screen printing mechanism would have to be moved synchronously with the belt 12 and the object carried thereby. On the other hand it is also possible for the operation of printing on the objects to be effected by means of rotary printing during the stoppage of the objects, that is to say between two transport steps, in which case then the rotary printing mechanism would have to be linearly movable.

As a departure from the embodiment illustrated in the drawing, continuous transport of the belt is also a possibility, which could be effected using two linear motors which transport the belt alternately with mutually overlapping motion phases.

In the stepwise transport and use of only a first pair of grippers 36*a*, 36*b*, the embodiment illustrated in the drawing has a second pair of grippers with two grippers 38*a*, 38*b* which are associated with the upper belt portion 18 in mutually opposite relationship in a similar fashion to the first pair of grippers 36*a*, 36*b* and which can engage mutually oppositely disposed edge regions of the belt 12 and thus hold the belt and fix it in its position during the periods of time between each two successive transport steps so that the belt 12 and the respective objects carried thereby do not change in position during the stoppage phases. That second pair of grippers 38*a*, 38*b* is thus stationary in the sense that the grippers do not participate in the transport steps of the belt.

Of the two jaws of each gripper 36*a*, 36*b* and 38*a*, 38*b* of the two pairs of grippers, only the respective lower jaw is movable for the purposes of opening and closing the respective gripper. The upper jaws in each case are stationary in the sense that they are not movable for the purposes of opening and closing the respective gripper. In that respect the arrangement is such that the belt is disposed with its edge regions in the direct proximity of the upper jaw, and is possibly guided thereby, so that it is possible for vertical movements of the edge regions under the influence of the grippers as they open and close to be at least very substantially avoided.

The first pair of grippers 36*a*, 36*b* is mounted to a carriage 40 on which the movable part of the linear motor which is not shown in the drawing is also mounted, the linear motor producing the reciprocating movements of the carriage 40 and entraining the belt 12 in the forward movement in the direction of the arrow 24. The stationary part of the linear motor is carried by the machine frame 41. The reciprocating movements of the carriage 40 are limited by two abutments indicated at 42, 44 in FIGS. 1 and 2 which are fixed to the machine frame 41 and of which the first abutment 42 limits the movement of the carriage 40 in the transport direction 24 and the second abutment 44 limits the movement of the carriage 40 in the opposite direction. Disposed at each end of the carriage 40 is a shock absorber 46 and 48 respectively which in the respective end position co-operate with the first or second abutment. The abutments 42, 44 and the shock absorbers 46, 48 only have an auxiliary function because the movement of the carriage, at least in the transport direction 24, can be regulated preferably in dependence on the movements of the printing mechanism, in particular the printing cylinder, in which respect the motion phases which from a functional point of view are not dependent on the printing mechanism or any other treatment station can be controlled using a computer program. The abutments 42, 44 thus substantially represent an additional security aspect, more specifically in particular in those operating phases, for example when starting up the machine, when not all parts of the machine are yet performing their functions in the manner which is usual under normal operating conditions.

Figure 5:
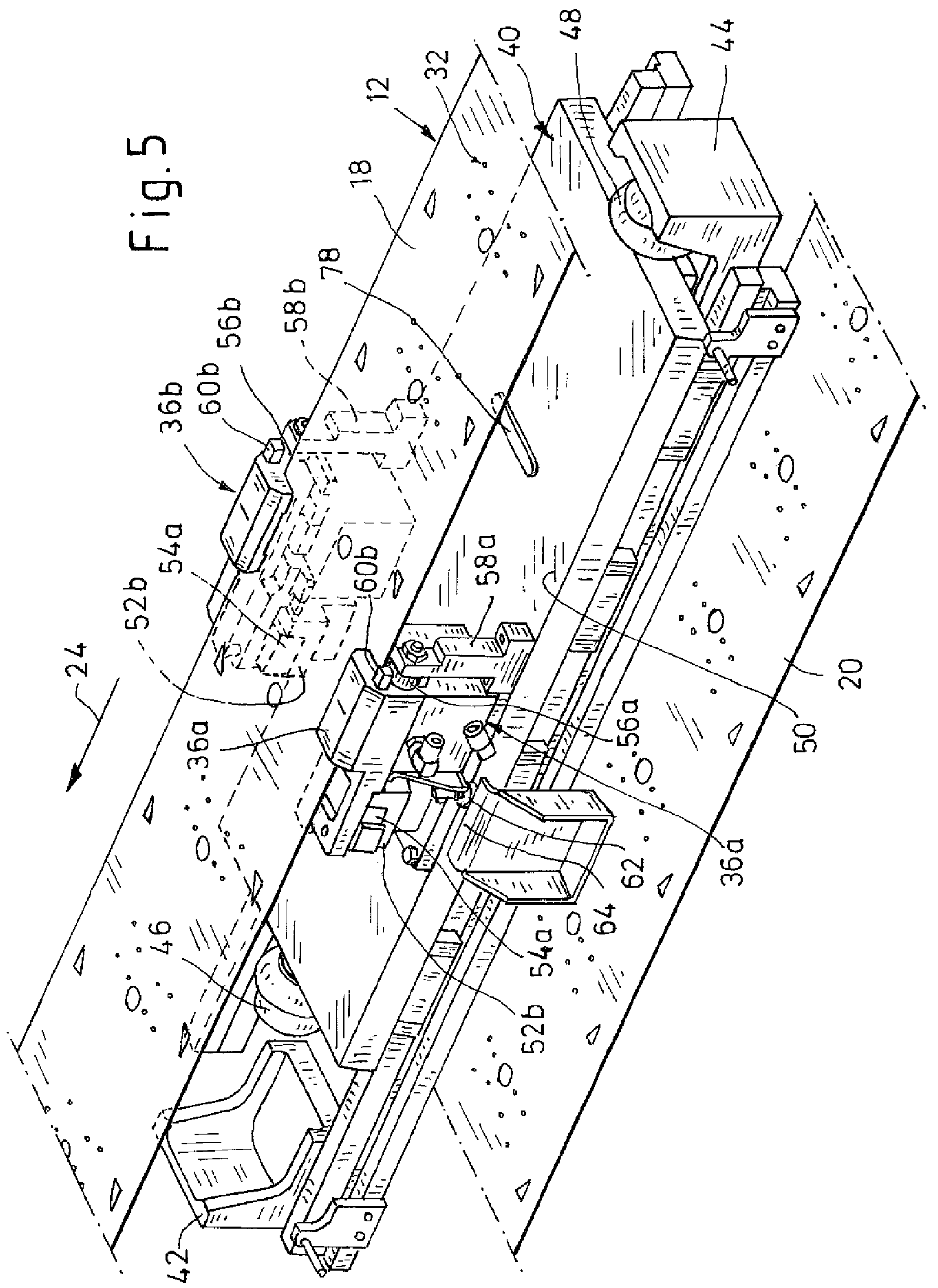
FIG. 5 shows a perspective view of an arrangement for driving the belt, in which parts have been omitted.

Referring to FIG. 5 the carriage 40 is provided with a base plate 50 to which the two grippers 36*a*, 36*b* are mounted in such a way that they are displaceable by a short distance transversely with respect to the upper belt portion 18, that is to say transversely with respect to the direction of movement 24 thereof in substantially parallel relationship with the plane of the belt portion 18. For that purpose a guide shoe 52*a* and 52*b* respectively which extends in the transverse direction can be associated with each of the two grippers 36*a*, 36*b*. A respective short bar portion 54*a* and 54*b* respectively is guided in each of the respective guide shoes, with the respectively associated gripper 36*a* and 36*b* being fixedly connected to the respective bar portion 54*a* and 54*b*. That guide arrangement can be disposed at the side of the respective gripper 36*a*, 36*b*, which is the front side in the transport direction 24. A further guide can be provided at the other side of the respective gripper, that is to say the side which is the trailing side in the transport direction 24. The further guide predominantly has a support function and is provided with a respective roller 56*a* and 56*b* carried by a support stand 58*a*, 58*b* fixed like the guide shoe 52, 54 to the base plate 50 at the top side thereof. At its side which is the rearward side in the transport direction 24, each gripper 36*a*, 36*b* is provided with a parallelepipedic extension 60*a*, 60*b* whose underneath boundary surface extends substantially tangentially with respect to the respectively associated roller 56*a*, 56*b* and is supported thereon. As the extent of the movements of each gripper transversely with respect to the longitudinal direction of the belt is only slight and at a maximum constitutes a few millimeters, the two extensions 60*a*, 60*b* can be of a relatively narrow configuration.

The above-described transverse mobility of the two grippers 36*a*, 36*b* takes account of the fact that the belt can experience certain transverse displacements during the transport movement. It is admittedly possible to counteract such transverse displacements by suitable adjustment of at least one of the deflection drums 14, 16 which are suitably adjustably mounted. Nonetheless there can however still be such a deviation, even if only of slight extent. If required, that is to be taken into consideration by virtue of the grippers 36*a*, 36*b* being transversely movably arranged, in order to prevent noticeable forces which do not extend in the longitudinal direction of the belt being caused to act on the belt by the grippers.

Still referring to FIG. 5 a guide roller 62 can be associated with each of the two grippers 36*a*, 36*b* which cause the transport movement of the belt 12. The guide roller 62 co-operates with a stationary guide surface 64 mounted to the machine frame. The arrangement in that respect is such that, in the course of the reverse movement of the carriage 40 in the opposite direction to the transport direction 24 into the starting position for the next transport step, the guide roller 62 comes into contact with the guide surface 64 in any case when the respectively associated gripper 36*a* or 36*b*, at the end of the above-specified transport step and thus at the end of a transverse movement which possibly occurs in that situation, assumes an extreme position in which further transverse displacement would not be possible. The consequence of the co-operation of the guide roller 62 and the guide surface 64 is then that the associated gripper, in the course of the reverse movement into a central position between the two extreme positions, is displaced transversely with respect to the transport direction of the belt so that if required, in the following transport step, in dependence on the respective position of the belt 24, the above-mentioned associated gripper can be displaced in the respectively required direction of the two possible directions.

Referring back to FIG. 1 arranged beneath the upper belt portion 18 is a plate-shaped arrangement 68 which on the one hand serves for making a communication between the holding means 26 on the upper belt portion 18 and a reduced pressure source and which on the other hand can support the upper belt portion 18 and contribute to guiding it. This will be described more fully hereinafter.

As the transport belt 12 is not rigid but flexible it may be necessary, at least in certain regions of the upper belt portion 18 with which at least some of the treatment stations A-K are associated in the illustrated embodiment, for the upper belt portion 18 to be supported so that the objects lying on the belt can be subjected to the effect of forces which are carried by a support arrangement so that this prevents inadmissible deformation of the belt and uncontrolled movements of the objects under the effect of those forces.

Figures 6, 7, 8:
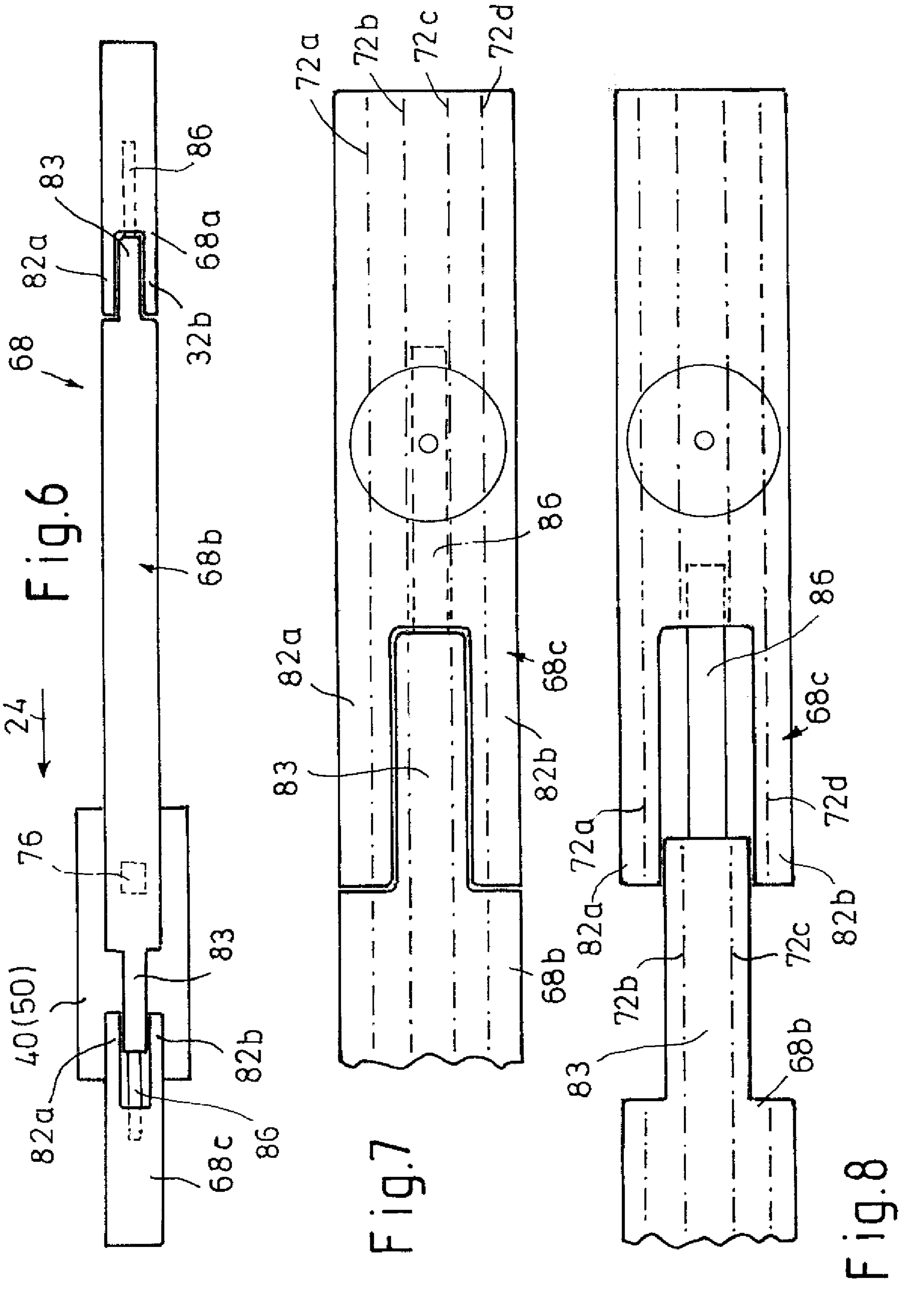
FIG. 6 is a highly diagrammatic plan view of the arrangement associated with the upper belt portion for making a communication between holding means and a reduced pressure source and for supporting the belt.
FIG. 7 is a view corresponding to FIG. 6 of a partial region of the arrangement on a larger scale in a first relative end position of two co-operating portions of the arrangement.
FIG. 8 shows a view corresponding to FIG. 7 of the two portions in the second relative end position thereof.

Considering now also FIG. 6 in the embodiment illustrated in the drawing, that arrangement 68 which is disposed immediately beneath the upper belt portion 18 is provided with a support plate assembly comprising three support plates 68*a*, 68*b*, 68*c* which are arranged in succession in the longitudinal direction of the belt and of which the central support plate 68*a* is reciprocatable in a horizontal plane in the transport direction 24 of the upper belt portion and in the opposite direction thereto while the other two support plates are arranged stationarily. The arrangement 68 can be of such dimensions transversely with respect to the transport direction 24 that it substantially supports the belt portion 18 in the region in which the objects being transported by the belt are disposed.

Figure 4:
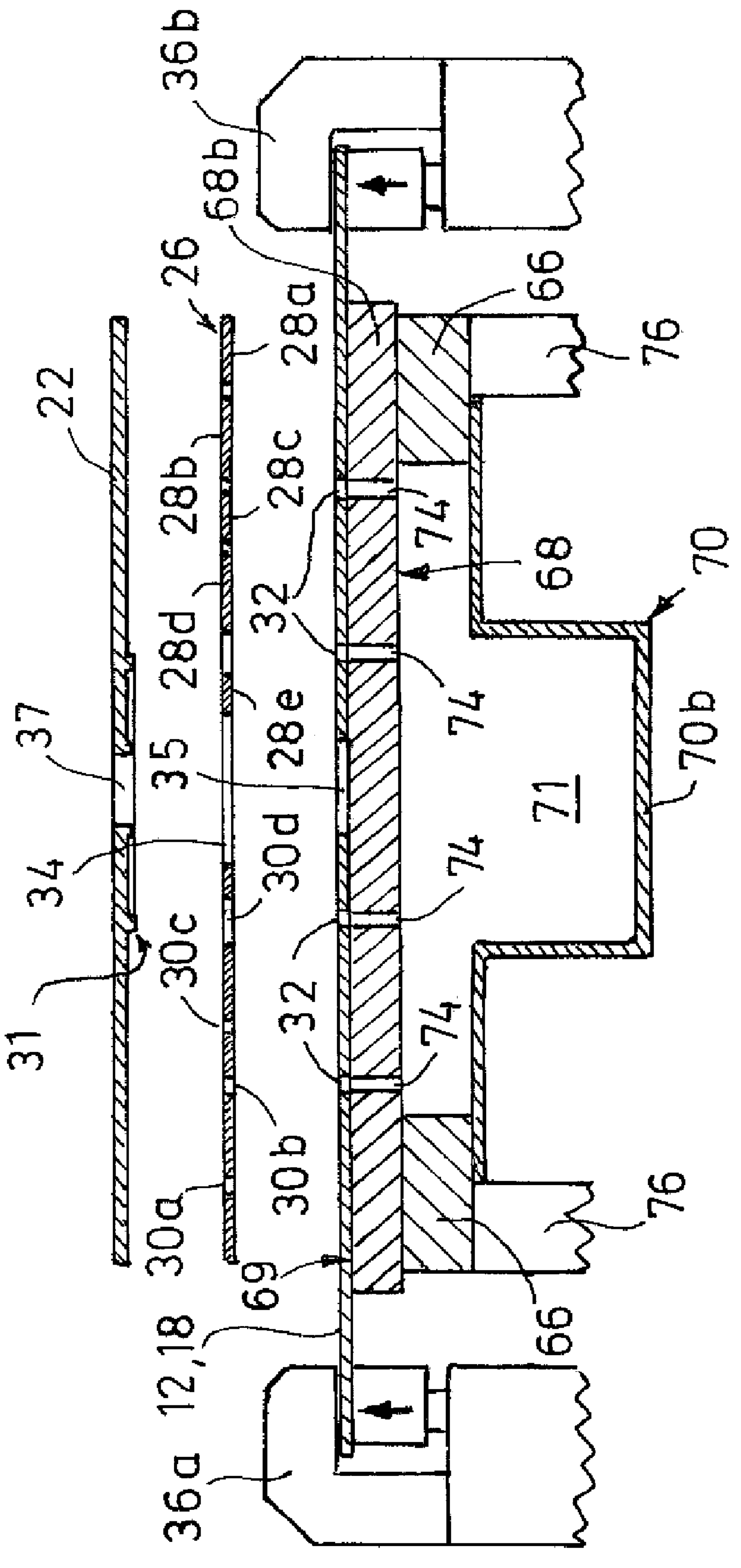
FIG. 4 shows a section taken along line IV-IV in FIG. 3.

Referring to FIG. 4 mounted beneath each support plate 68*a-c* is a respective U-shaped portion 70*a*, 70*b*, 70*c* which is sealingly connected to the respective support plate 68*a-c* and which extends in the longitudinal direction of the belt portion 18, in such a fashion that the respective support plate 68*a-c* covers over at the top and substantially closes a reduced pressure passage 71 which is delimited by the U-shaped portion 70*a-c* and which is connected to a reduced pressure source.

Figure 9:
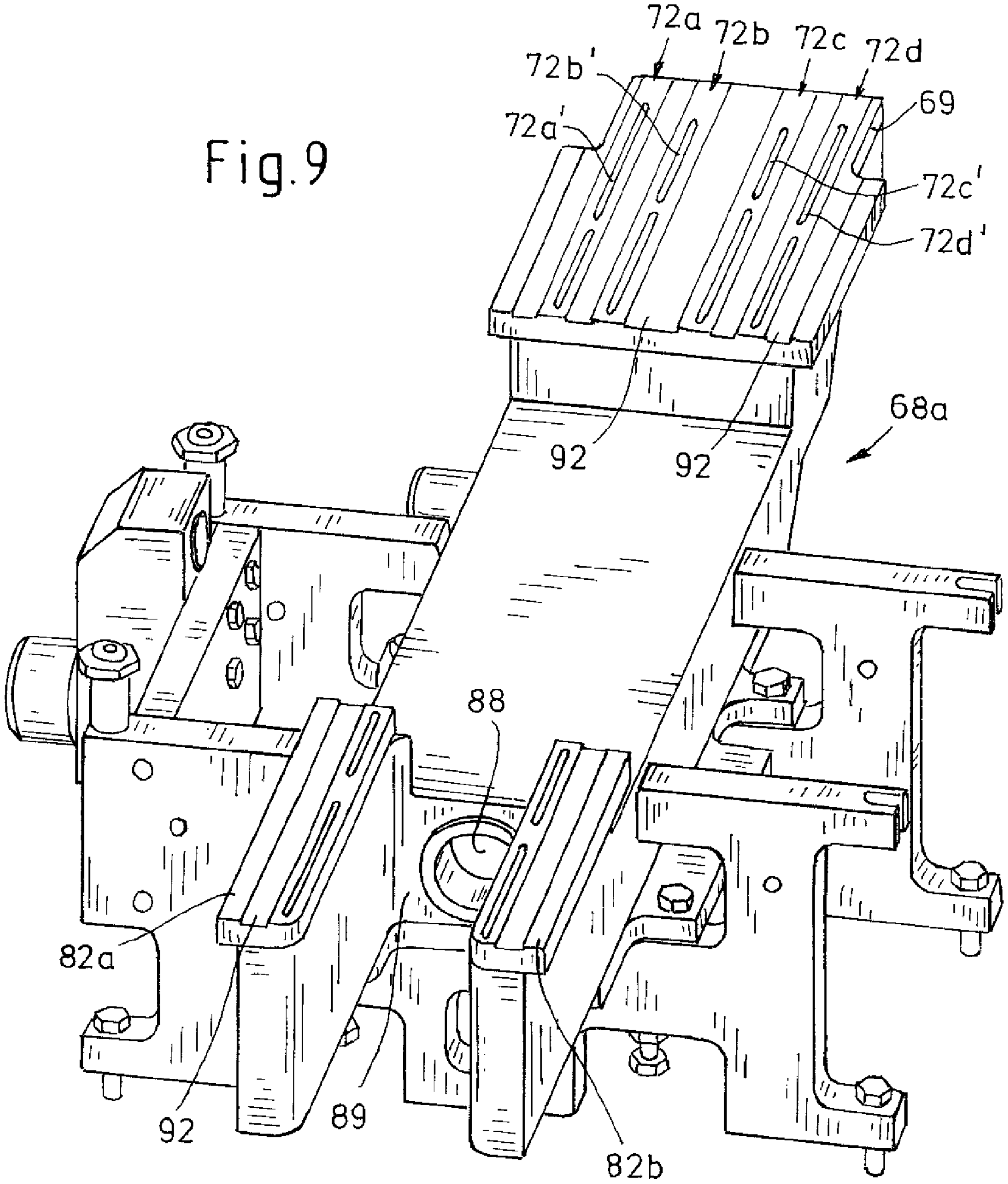
FIG. 9 shows the perspective view of the portion of the arrangement shown in FIG. 6, which is towards the station in which the objects to be printed upon are placed on the belt.
Figure 10:
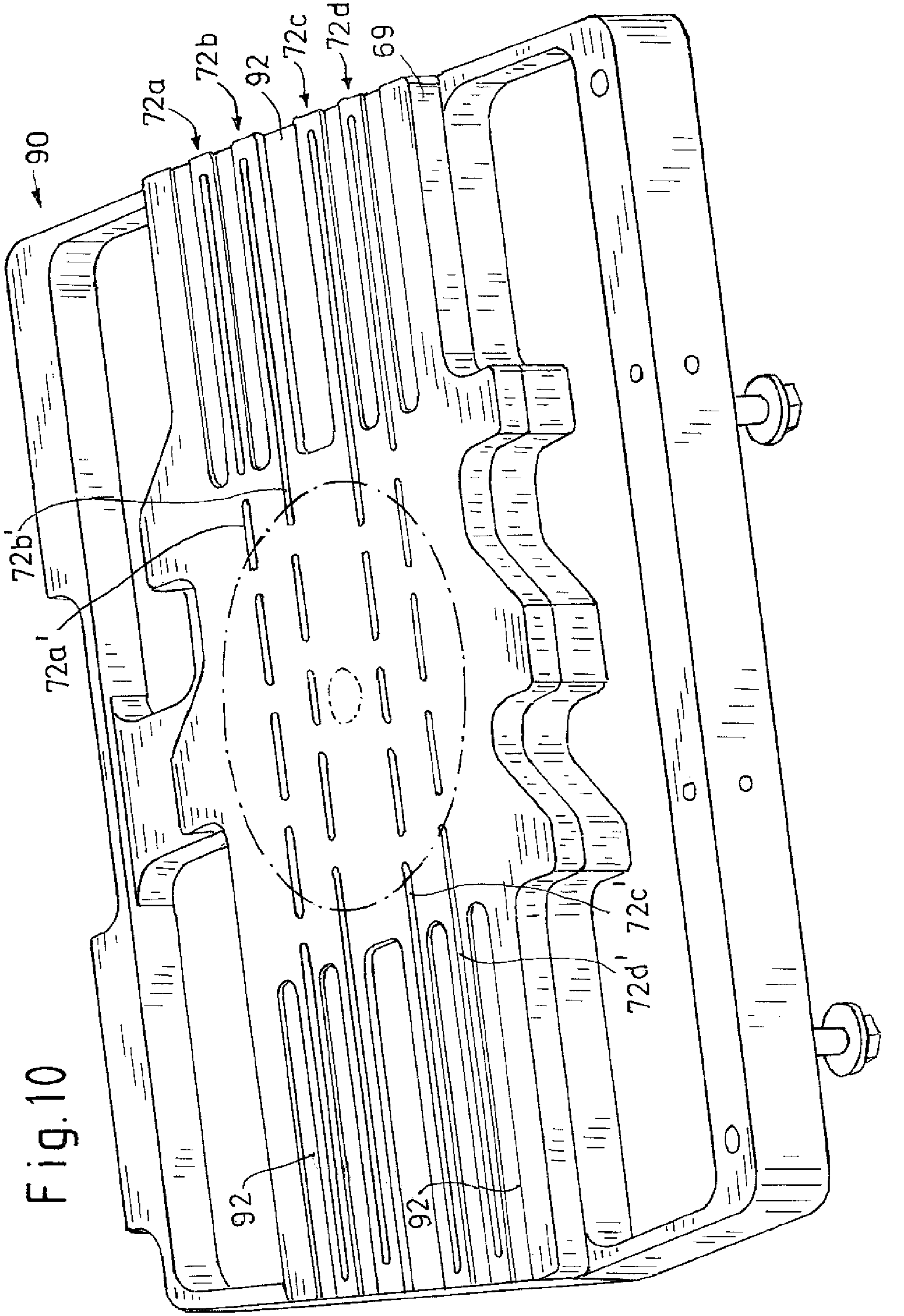
FIG. 10 shows a perspective view of a part of the portion shown in FIG. 9.

At its side towards the belt portion 18 each support plate can be provided with a flat coating or layer indicated at 69 in FIGS. 9 and 10 comprising a material such as for example plastic material with a low coefficient of friction. That layer 69 can be provided at the top side with upwardly open groove-shaped recesses 72*a*, 72*b*, 72*c*, 72*d* which extend in the longitudinal direction and which are provided for example by means of milling or shaping. The upper belt portion 18 can rest on the support plates 68*a-c* and thus close off at the top side the groove-shaped recesses 72*a-d* which are provided on the support plates or the respective layer 69 thereof, thereby to form longitudinally extending passages.

The groove-shaped recesses 72*a-d* can extend on each support plate 68*a-c* over their entire or almost their entire length, in which case they should each be closed at their ends, near the ends of the respective support plates. It has however proven to be desirable for the groove-shaped recesses 72*a-d* to be respectively subdivided into groove portions indicated at 72*a*', 72*b*', 72*c*', 72*d*' which are respectively arranged in a row in the longitudinal direction of the belt portion 18 at spacings from each other. Overall there can be four groove-shaped recesses extending in the longitudinal direction of the belt, or rows of groove portions, in such an arrangement that at each side of the row of openings 34, 35 which extends along the belt, in the holding means 26 or the belt 12, there are two rows of recesses or groove portions which extend substantially symmetrically relative to the center line of the upper belt portion 18. A suitable arrangement for the groove portions 72*a*', 72*b*', 72*c*', 72*d*' is illustrated in the drawing and in particular in FIGS. 3, 9 and 10. The groove portions of at least two rows are arranged in mutually displaced relationship in the longitudinal direction in such a way that, having regard to the placement of the holes 32 in the belt 12 for the reduced pressure to act therethrough, this guarantees that, in any position of a holding means carrying an object, during transport thereof from the station A to the station K, the respective object is subjected to the effect of reduced pressure which is appropriate to the respective conditions, for example the forces acting on the object, and ensures that the object is adequately fixed on its holding means.

The configuration of the groove-shaped recesses in the form of the groove portions 72*a*', 72*b*', 72*c*', 72*d*' also has the advantage that the passages formed by those groove portions can be better sealed off by the belt 12 which covers over the latter and also the magnitude of the forces which are produced by the reduced pressure and which act on the belt and which determine the intensity of the friction between the belt and the support plates can be influenced, for example by suitable dimensioning of the spacings between the individual groove portions 72*a*'-*c*' of a row of groove portions and therewith also the length of the latter.

Preferably vertical passages 74 are provided in each support plate 68*a-c*. The passages 74 communicate the respective portion of the reduced pressure passage 71 with the groove portions at 72*a*'-*d*' in FIG. 4. Those passages 74 can be of a diameter of between for example 1 and 2 mm. By virtue of their association with the groove portions they are also arranged in rows which extend lengthwise.

The through holes 32 in the belt 12 for the reduced pressure to act therethrough are also arranged in rows as indicated at 33*a*, 33*b*, 33*c*, 33*d* in FIG. 3, more specifically in such a way that a row of holes 32 is associated with each row of groove portions 72*a*'-*d*' so that a reduced pressure which obtains in those groove portions can pass through the belt and thus passes into the region of the openings 30*a-d* in the respective holding means 26 in the upper belt portion. In the region of the spacings between the individual groove portions 27*a*'-27*d*' of a row the communication between the groove portions and the respectively associated holes 32 in the belt is interrupted or at least greatly reduced, in which case, as already mentioned, care is to be taken to ensure that the action of the reduced pressure on the underside of the object is then still maintained by way of another row of groove portions 27*a*'-*d*' and an associated row of holes 32.

The central support plate 68*b* as well as the portion 70*b*, carried thereby, of the U-shaped portion forming the reduced pressure passage 21 participate in the reciprocating movements of the linear motor and thus also the carriage 40 in such a way that the movement of the support plate 68*b* in the transport direction 24 of the belt takes place synchronously with the movement of the belt. That ensures that suitable support of the belt 12 and thus the object is guaranteed in the stations D-G which are associated with the support plate 68*b* and in which the treatment operation, in particular applying printing to the objects, is effected by means of rotary printing during the transport step, without relative movement occurring between the belt and the support plate. The latter is also advantageous for the reason that in that way, during the transport step and thus during the treatment operation, the relative position between the groove portions 72*a*'-*d*' in the support plate 68*b*, the holes 32 in the belt 12 and the openings 30*a-d* in the holding means, through which the reduced pressure required for fixing the object on the respective holding means is caused to act on the underside of the object, remains unchanged.

The synchronous movements of the support plate 68*b* with the carriage 40 and the movement of the upper belt portion 18 in the transport direction 24 can be achieved in a simple manner by the support plate 68*b* being connected to the carriage 40 and thus being entrained thereby. That connection is made by an entrainment support post shown at 76 in FIG. 1 which is mounted on the base plate 50 at the top side and with its end remote from the base plate 50 to the underside of the U-shaped portion 70*b* which is carried by the support plate 68*b* and which forms the central portion of the reduced pressure passage 71. The entrainment support post 76 is disposed in the region beneath the rotary printing station G. In that respect its vertical extent is such that the upper boundary of the support plate 68*b* is at a height which permits the upper belt portion 18 to be carried by the support plate 68*b*.

For reasons of clarity of the drawing FIG. 5 does not show the support plate assembly 68 and the entrainment support post 76. It is however possible to see the fitting key 78 at the top side of the base plate 50, on which the entrainment support post 76 is fitted in order to precisely establish the position thereof.

The central support plate 68*b* extends in the opposite direction to the transport direction 24 from the rotary printing station G to the rotary printing station D. In the region of the printing stations D through F, it is supported by respective stationary support stands 78*a, b, c* which are provided at the top end with a respective shoe 80*a*, 80*b*, 80*c* on which the lower boundary of the central portion 70*b* of the reduced pressure passage rests, possibly by way of friction-reducing intermediate members That arrangement provides that the forces exerted by the printing cylinders of the stations I-III are also transferred directly into the machine frame by way of the support stands 78*a*, 78*b*, 78*c*.

The two stationary support plates 68*a* and 68*c* which are arranged upstream and downstream of the reciprocatable support plate 68*b* in the transport direction are provided on the top side in the same or similar manner with the groove portions 30*a*', 30*b*', 30*c*', 30*d*' which are closed at the top side by the upper belt portion 18. A respective reduced pressure passage 71 is also provided beneath each of the two stationary support plates, which passage can be formed in a suitable fashion, therefore by a U-shaped portion.

FIGS. 6 through 8 show the co-operation of the movable central support plate 68*b* with the two stationary support plates 68*a*, 68*c*. The two stationary support plates 68*a, c* are of a forked configuration at their respective end region which is towards the central support plate 68*b*, in such a way that they are each provided with two lateral prong-like extensions 82*a*, 82*b* which telescopically co-operate with a respective central extension 83 at each end of the reciprocatable support plate 68*b*. Referring to FIGS. 6 and 7 shown therein is the central support plate 68*b* in an end position corresponding to the position of the drive carriage 40 in FIG. 5, in which the drive carriage 40 is assuming its end position of being towards the deflection drum 14. FIG. 8 shows the opposite end position of the reciprocatable support plate 68*b*.

Referring to FIGS. 7 and 8 it is also possible to see therefrom that, in the end regions in which the extensions 83 of the central support plate 68*b* respectively overlap with the forked extensions 82*a*, 82*b* of the two stationary support plates 68*a*, 68*c*, the longitudinally extending reduced pressure passages or groove portion are respectively associated with the extensions in such a way that the two central rows which are formed by the groove portions 72*c*', 72*d*' respectively extend along the central extensions 83, 84 of the central support plate 84*b* or are continued thereon, whereas the two outer rows 72*a*, 72*d* respectively extend to close to the end of the respectively associated forked extension, as can also be seen from FIG. 9. Starting from the position of the components as shown in FIG. 7, an object disposed in the overlap region of the extensions 83, 82*a*, 82*b* would firstly be subjected to the action of the reduced pressure which is caused to act through the groove portions of all four rows 72*a-d*. In the course of the movement from the position shown in FIG. 7 into that shown in FIG. 8, regions of the object which become larger are only exposed to the reduced pressure which is supplied through two rows of recesses until the end position shown in FIG. 8 is reached. The reduction, which occurs under some circumstances in that case, in the pressing force by which the object is fixed in its position on the respective holding means 26 and thus the upper belt portion 18 can be taken into account by virtue of the fact that, in those two transitional regions for the supply of the reduced pressure, no treatment operations are carried out on the object or only those treatment operations are carried out which do not apply any forces to the object, for example contact-less drying by means of UV-radiating devices.

It will be appreciated that it would also be possible to apply a lower reduced pressure in the regions of the extensions 83 and 82*a*, 82*b* which are narrower in comparison with the rest of the width of the support plates. In general terms however that is not necessary if the altered reduced pressure conditions in the two transitional regions are taken into account in the manner described.

Feeding the reduced pressure into the groove portions of the central extensions 83 at the central support plate 68*b* and the forked extensions 82*a*, 82*b* at the stationary support plates 82*a*, 82*b* is effected by way of passages which are arranged within the respective support plate or the associated extensions so that the U-shaped portions 70*a-c* do not extend into the respective overlap region.

In general terms it is desirable for the reduced pressure passage 71 of at least one of the U-shaped portions 70*a*, 70*c* of the stationary support plates 68*a*, 68*b* to be connected to the reduced pressure source, in which case then the U-shaped portions 70*a*, 70*b*, 70*c* are connected together by tube portions indicated at 86 for example in FIGS. 1, 7 and 8 which are fitted for example to the ends of the U-shaped portion 70*b* of the reciprocatable central support plate 68*b* and co-operate telescopically with openings at the associated front ends of the U-shaped portions 70*a*, 70*c* of the stationary support plates 68*a*, 68*c*. FIG. 9 shows the hole 88 in the reduced pressure passage portion 71 associated with the front end 89, which is towards the central support plate 68*b*, of the stationary support plate 68*a* which is first in the transport direction 24, the tube portion 86 engaging in reciprocatable sealing relationship into the hole 88.

FIG. 9 further shows that the stationary support plate 68*a* which is first in the transport direction is provided with a replaceable part 90 which is shown in FIG. 10 and whose top side, which receives and supports the upper belt portion 18, is provided in the above-described manner with groove portions 72*a*'-*d*' for the feed of the reduced pressure. That replaceable design configuration takes account of the fact that, in the region which is occupied by that replaceable part 90, in the embodiment illustrated in the drawing, there can be a screen printing station in which printing ink can run on to the support plate and possibly into the recesses and the like which serve as conduit means for the reduced pressure so that cleaning of the plate is required at given time intervals. That can be carried out more easily if the part to be cleaned can be easily removed from the machine and possibly replaced.

Reference is now made to FIGS. 9 and 10 to describe an additional measure which can serve to influence the degree of effectiveness of the reduced pressure which is applied through the recesses 72*a-d*, in dependence on the respective factors and circumstances involved. Thus the two components shown in FIGS. 9 and 10 have additional air intake passages 92 at the upper boundary surface of the low-friction coating 69 which carries the groove-shaped recesses 72*a-d* or groove portions 72*a*'-73*d*' for the reduced pressure. Those air passages 92 are delimited at the top side by the belt which rests on the support plates, in the same way as the recesses 72*a-d* or groove portions 72*a*'-*d*'. In contrast to the recesses 72*a-d* which are connected to a reduced pressure source however the air passages 92 are connected to the atmosphere. For that purpose it is sufficient for them to be simply allowed to open into the open air, as can be seen for example from FIG. 9. Those additional air passages 92 can also be provided on the other support plates, in dependence on the respective circumstances involved for achieving the same purpose, more specifically for example for influencing the friction between the belt and the support plate.

The additional arrangement of air intake passages also makes it possible to influence the extent of the forces which are produced by the reduced pressure and which fix the objects on the respective holding means. It will be seen from FIG. 10 that for example the middle region of the replaceable part 90 which in the installed condition thereof is associated with a screen printing station does not have any air intake passages at all so that here the reduced pressure is operative to its full extent and thus securely fixes the object during the printing operation. In the two immediately adjoining regions the object is respectively transported from and to the respective next treatment station. For that purpose it is necessary for the upper belt portion 18 to slide on the top side of the coating 69, with the stationary support plate 68*a*. The way in which the air intake passages are provided makes it possible to adjust the conditions in such a way that on the one hand the object resting on the respective holding means is still guaranteed to be sufficiently fixed by the reduced pressure, but on the other hand, outside the actual printing station or another station in which particularly secure fixing of the object is required, the belt is not pressed against the surface of the plate 69 to the extent as would be the situation without the air intake passages.

Accordingly arranging such air passages at the locations which are respectively appropriate for same along the support plate arrangement 68 makes it possible to provide that the forces required for fixing the objects on the associated holding means can be adjusted in dependence on the respective demands involved in order thereby also to minimise the energy expenditure for the advance movement of the belt. Such air passages can thus be provided at those regions along the transport path between the deflection drum 14 and the deflection drum 16, in which no additional forces act on the objects.

Where the air intake passages are provided it is possible for example to prevent the reduced pressure taking effect over the entire width of the support plate on the underside of the belt, that is to say the side thereof which is towards the support plate, and counteracting the advance movement of the upper belt portion 18 by causing high frictional forces during the transport steps in the region of the stationary support plates. That is of no relevance in the region of the central support plate 6*b* as that plate is moved synchronously with the belt. It will be noted however that the central support plate 68*b* moves back into its starting position again while the belt is stopped between two transport steps, and that movement also has to be effected against the action of the frictional forces between the belt and the central support plate.

The illustrated embodiment of a printing machine for printing CDs and similar information carriers is used in such a way that, in the station A, the objects to be printed upon are placed on the respective holding means 26 disposed in that station A. That is effected by means of known transfer devices which take the CD from a stack by means of a suction gripper and place it individually on the holding means 26 respectively disposed in the station A and in so doing also position it correctly at the same time. Accurate orientation of the CD relative to the holding means is effected in the usual manner by a bar or spindle which is arranged in the station A in such a way that it can move up and down and which is passed through the openings 35 and 34 respectively in the belt 12 and in the holding means 26. The procedure in that respect is such that, immediately after termination of the respective transport step being carried out by the belt 12, the spindle which is not shown in the drawing is moved into its operative position in which it extends through the two openings 35 and 34. When the object carried by the suction gripper is placed on the holding means it is guided with its central opening 37 over the spindle so that, when it reaches its end position on the holding means, it is oriented properly in relation thereto and thus in relation to the belt 12 and assumes a given position which can represent the reference position for all operating measures which are subsequently effected for orientation of the belt 12 and the printing mechanisms. The operations of fitting the CD on to the holding means and definitively orienting it thereon are effected between two transport steps of the belt 12, the object being held by the reduced pressure which is operative at the holding means from the moment that the object comes to lie on the holding means so that the spindle can be retracted in good time before the beginning of the following transport step into a position in which it is outside the region of movement of the belt and the parts which are movable therewith. The stationary support plate 68*a* can be provided with a hole 98 for the spindle to pass therethrough.

After two transport steps along the linear transport path defined by the upper belt portion the CD passes by way of an intermediate station in which if necessary some treatments or checking operations are also performed into the screen printing station B in which a primer or another application medium is applied by means of screen printing to the CD while it is at rest between two transport steps. The part already described hereinbefore with reference to FIG. 10 can be associated with that screen printing station B. In the course of further transport steps the CD passes into the starting position for the first rotary printing operation, for example by means of offset printing, in the station D. During the preceding transport movement and also in the station C which is between the stations B and D, the ink applied in the screen printing station B can be dried. That can also be effected, possibly in addition, during the transport steps.

The operation of applying printing to the object in the station D takes place in the course of a transport step, during which the linear movement of the CD and thus of the belt 12 correspond to the peripheral speed of those portions of the printing cylinder 91, which carry the print image that is to be transferred In the course of the following transport steps the operation of applying further partial print images is effected in the stations E, F and G, those partial print images then combining together in the majority of cases to afford an overall print image, the quality of which depends in particular on accurate association of the individual print images with each other and thus the orientation of the respective object in relation to the individual rotary printing mechanisms. Drying of the printing ink which is possibly required after each application of a respective partial print image can be effected during the transport movement to the respective next printing station but if necessary also in a drying station which is disposed between two successive printing stations and which is also shown separately.

During the printing operations in the rotary printing stations the central support plate 68*b* is advanced synchronously with the belt and the object carried thereby so that there is no relative movement between the belt with the object on the one hand and the support plate on the other hand. That applies to all rotary printing stations.

After the object has passed through the last rotary printing station G a further drying operation is again carried out in the station H before the object is then checked in the station 3 in respect of the quality of the print image. That is usually effected between two transport steps. In the station K immediately before the deflection drum 16 the printed CD is removed from the respective holding means in that station, using known devices, for example a suction gripper, and generally stacked in a magazine. Those handling operations are also familiar to any man skilled in the art so that they do not need to be particularly described here. The station K can possibly include additional means, for example in the form of controllable air intake means, which influence the pressure conditions in order to make it easier to remove the objects from the belt.

It will be appreciated that it is possible for the apparatus to be provided with fewer treatment stations or also additional treatment stations, depending on the respective requirements involved. Ultimately that depends on the respective requirements which can also determine the length of the transport belt and the associated items of equipment. The feed device and the support plate assembly can also be reciprocatable in its entirety in the longitudinal direction of the belt.

The grippers 36*a*, 36*b* which provide the transport effect are arranged just before the removal station, in the transport direction 24, at any event downstream of the printing stations shown in FIGS. 1 and 2 so that the upper belt portion 18 is clearly subjected to a tensile loading over the major part of its length during the transport movement. The grippers 38*a*, 38*b* which hold the belt between the transport steps can also be arranged shortly before the removal station in the transport direction 24.

For the purposes of detection of the position of the belt 12 and thus the position of the respective object the belt is provided with markings in the form of triangular apertures 93 which make it possible to determine the position thereof both in the longitudinal direction and also in the transverse direction. For that purpose the apparatus is provided with at least one sensor 94 which detects at least one of the markings. In that way it is possible to establish the respective length of the belt prior to the commencement of operation of the apparatus in each case, making use of one of the markings 93 and a sensor 94, and to detect for example changes in the length of the belt due to temperature influences. In dependence thereon, the respective length of the transport step can then be decided upon and controlled by means of computers.

Practice has shown that frequently the belt does not run precisely straight but experiences lateral deviations of the order of magnitude of some millimeters. Those deviations can be very substantially compensated by suitable adjustment, also under computer control, of the shaft 96 of one or possibly also both deflection drums 14, 16. In order to meet all demands in regard to print image quality it may be appropriate to compensate for any deviations which possibly still remain by the individual printing mechanisms, in the present case therefore in particular the rotary printing mechanisms, being displaced transversely with respect to the longitudinal displacement of the belt in order to ensure accurate relative orientation of the object with respect to the printing mechanism, after the position of the respective CD has been established. For that purpose it is possible to associate such a sensor 94 with each printing mechanism in respect of which such accuracy is important and, for each printing mechanism or at least for more than one printing mechanism, to individually determine the positioning thereof. In general however it is sufficient in normal operation to detect the position of the belt and therewith the object upstream of the printing mechanism of the first rotary printing station, that is to say for example upstream of the printing station D, to compare it in the computer to a reference value and then to determine the positioning for the following printing mechanisms, using the result of that comparison operation, under computer control, as the lateral displacement of the upper belt portion advances with the transport movement thereof from one station to another. In the illustrated embodiment a sensor 94 is also associated with the screen printing station B which is arranged upstream of the rotary printing station in the transport direction 24. In that case it would possibly suffice in normal operation to detect the position of the belt and therewith the object upstream of the screen printing mechanism and then to position the following rotary printing mechanisms under computer control in accordance with the above-described procedure. In this case also the way in which the relative orientation is achieved between the respective printing mechanism and the object is determined by the respective circumstances involved.

Although the invention has been described hereinbefore in relation to printing CDs and similar, generally circular objects which are frequently provided with a central opening, the invention is not limited to printing on objects of that kind. It is also possible for other objects and in particular also objects of different shapes and dimensions to be printed upon, coated or treated in some other way, in which respect the contour of the CD can also be used for accurate positioning thereof. That can be effected by way of a sensor but possibly also by way of a device which detects the object at its periphery or parts thereof in order to place it on the belt.

A corresponding consideration also applies in regard to the methods used for printing and coating the objects. It is also possible to use methods other than those referred to in this application, for example screen printing and offset printing.

It will be apparent from the foregoing description that the combination of the flexible belt with the flexible holding means in the form of simple portions of soft material, for example film material of polyurethane, represents a considerable advance over the state of the art, more specifically in particular for the reason that complicated and expensive holding devices in carriage form which are present in the prior arrangement are not required and thus the masses to be moved are considerably reduced. Smooth operation of the machine is achieved even when stepwise transport is involved. The amount of wear is substantially less. The replacement of worn parts, that is to say in particular the inexpensive holding means, can be effected without taking a great deal of time. Overall the invention permits a considerable simplification both in the apparatus and also the operational procedure involved therewith, without that being at the cost of accuracy and thus print image quality. The invention therefore makes it possible to apply coatings and produce high-quality print images or other decorations involving a substantially lower level of complication and expenditure.

It will be appreciated that the above-described embodiment has been set forth only by way of example and illustration of the invention and that various modifications and alterations may be made in the invention without thereby departing from the spirit and scope of the invention.

What is claimed is:

1. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, and wherein the at least one holding means is adhesively fixed to the belt.

2. Apparatus as set forth in claim, wherein the belt comprises steel sheet.

3. Apparatus as set forth in claim 1, wherein the belt comprises plastic material.

4. Apparatus as set forth in claim 1, wherein the holding means comprises at least first and second parts arranged leaving a spacing and at least one hole in the belt is arranged in the region of the at least one spacing between two portions of the holding means.

5. Apparatus as set forth in claim 4, wherein the holding means comprises at least first and second parts arranged in concentric relationship.

6. Apparatus as set forth in claim 1, including at least one linear electric motor associated with the belt, the motor comprising a first part which is movable in the transport direction of the belt, at least one transport gripper, means operable to connect the first part of the motor to the transport gripper, and means for connecting the transport gripper to the belt in such a way that the movement of the movable part of the linear motor in one direction leads to synchronous entrainment of the belt and the at least one transport gripper is out of engagement with the belt during the oppositely directed movement of the movable part of the linear motor.

7. Apparatus as set forth in claim 6, including first and second transport grippers, and means for moving the transport grippers synchronously with each other at least in the direction of movement of the belt, wherein the means operable to connect the transport grippers to the belt are operable to connect the transport grippers in mutually opposite relationship to a respective one of first and second longitudinally extending edge regions of the belt.

8. Apparatus as set forth in claim 6, including a carriage carrying the movable part of the linear motor, the at least one transport gripper being mounted on the carriage.

9. Apparatus as set forth in claim 1, including at least one holding gripper, and means for bringing the holding gripper into relationship with the stopped belt in such a way that it secures the stopped belt in its respective position to prevent a change in the position thereof.

10. Apparatus as set forth in claim 9, including first and second holding grippers arranged in mutually opposite relationship in such a way that they can each be brought into relationship with a respective one of the longitudinally extending edge regions of the belt.

11. Apparatus as set forth in claim 1, including at least one linear electric motor associated with the belt, the motor comprising a first part which is movable in the transport direction of the belt, at least one transport gripper, means operable to connect the first part of the motor to the transport gripper, means for connecting the transport gripper to the belt in such a way that the movement of the movable part of the linear motor in one direction leads to synchronous entrainment of the belt and the at least one transport gripper is out of engagement with the belt during the oppositely directed movement of the movable part of the linear motor at least one holding gripper, and means for bringing the holding gripper into relationship with the stopped belt in such a way that it secures the stopped belt in its respective position to prevent a change in the position thereof, the arrangement being such that the belt is always in engagement with at least one of the two pairs of grippers.

12. Apparatus as set forth in claim 1, including a feed means for the reduced pressure arranged at least beneath the belt portion operable to carry the objects, means connecting the reduced pressure feed means to the reduced pressure source and to the openings in the belt and holding means thereby to cause the reduced pressure to act on the side towards the holding means of the object held thereby.

13. Apparatus as set forth in claim 12, wherein the feed means is subdivided into at least first and second portions of which at least one is arranged reciprocatably in the longitudinal direction of the belt, wherein the at least first and second portions are in overlapping relationship at their mutually associated end regions, the arrangement being such that a holding means in the overlap region is connected without interruption to the reduced pressure conduit of at least one of the portions of the feed means.

14. Apparatus as set forth in claim 13, wherein the mutually overlapping end regions of the at least first and second portions have at least one narrower extension extending in the longitudinal direction and the extensions of said end regions are arranged in mutually juxtaposed relationship and each portion has at least one reduced pressure feed conduit.

15. Apparatus as set forth in claim 14, wherein the end region of the first one of said at least first and second portion has a central narrower extension extending in the longitudinal direction and the end region of the respective other portion comprises first and second lateral forked extensions extending in the longitudinal direction and laterally embracing the central extension of said first portion, and wherein the central extension and the lateral extension of the second end region have at least one reduced pressure feed conduit extending in the longitudinal direction of the belt.

16. Apparatus as set forth in claim 13, wherein at least the reciprocatable portion of the reduced pressure feed means is formed at the same time as a support means for the belt disposed thereon with the objects.

17. Apparatus as set forth in claim 16, wherein the reciprocatable portion is disposed in the region of the treatment stations in which in operation a noticeable pressure is exerted on the objects.

18. Apparatus as set forth in claim 13, including a linear motor comprising a movable part, and means connecting the movable portion of the reduced pressure feed means to the movable part of the linear motor.

19. Apparatus as set forth in claim 12, wherein the reduced pressure feed means is flat and has a top side with groove-shaped recesses extending in parallel relationship with the transport direction of the belt and which are covered by the belt, further comprising means connecting the recesses to the reduced pressure source, and means connecting the respective opening in the belt in the region of the respective holding means to at least one of the groove-shaped recesses.

20. Apparatus as set forth in claim 19, comprising at least one longitudinally extending groove-shaped recess at each side of the center of each said holding means.

21. Apparatus as set forth in claim 20, wherein each of the groove-shaped recesses extending in the longitudinal direction is interrupted, thereby constituting at least first and second groove portions in a respective longitudinal row.

22. Apparatus as set forth in claim 21, wherein the groove portions are so arranged that at least some groove portions of the longitudinal rows are arranged in mutually displaced relationship in the longitudinal direction and overlap each other.

23. Apparatus as set forth in claim 21, comprising first and second rows of said groove portions at each side of the center of each holding means, wherein first and second central rows continue into the central extension of the end region of the one portion and of the first and second outer rows a respective one extends into each of first and second lateral forked extensions.

24. Apparatus as set forth in claim 1, including at least one marking on the belt for determining its position and the position of at least one object carried in operation thereby, at least one sensor for detecting said marking, means for comparing said detected marking to a reference position, and means operable in dependence on the result of the comparison to orient the relative position of at least one treatment means with respect to at least one object on the belt.

25. Apparatus as set forth in claim 24, wherein the markings are in the form of apertures in the belt.

26. Apparatus as set forth in claim 24, wherein said means for effecting relative orientation of the belt comprise means for movement of the belt in the longitudinal direction of the belt in at least one of the transport direction and the opposite direction.

27. Apparatus as set forth in claim 24, wherein said means for effecting relative orientation of the belt comprise means for displacement of the at least one treatment means relative to the belt transversely with respect to the longitudinal direction of the belt.

28. Apparatus as set forth in claim 24, including deflection drums for guiding the belt, and means for adjustment of at least one of the deflection drums in dependence on the result of the comparison thereby to influence the position of the belt transversely with respect to the transport direction thereof.

29. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, further including at least one linear electric motor associated with the belt, the motor comprising a first part which is movable in the transport direction of the belt, at least one transport gripper, means operable to connect the first part of the motor to the transport gripper, and means for connecting the transport gripper to the belt in such a way that the movement of the movable part of the linear motor in one direction leads to synchronous entrainment of the belt and the at least one transport gripper is out of engagement with the belt during the oppositely directed movement of the movable part of the linear motor.

30. Apparatus as set forth in claim 29, including first and second transport grippers, and means for moving the transport grippers synchronously with each other at least in the direction of movement of the belt, wherein the means operable to connect the transport grippers to the belt are operable to connect the transport grippers in mutually opposite relationship to a respective one of first and second longitudinally extending edge regions of the belt.

31. Apparatus as set forth in claim 29, including a carriage carrying the movable part of the linear motor, the at least one transport gripper being mounted on the carnage.

32. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, further including at least one linear electric motor associated with the belt, the motor comprising a first part which is movable in the transport direction of the belt, at least one transport gripper, means operable to connect the first part of the motor to the transport gripper, means for connecting the transport gripper to the belt in such a way that the movement of the movable part of the linear motor in one direction leads to synchronous entrainment of the belt and the at least one transport gripper is out of engagement with the belt during the oppositely directed movement of the movable part of the linear motor at least one holding gripper, and means for bringing the holding gripper into relationship with the stopped belt in such a way that it secures the stopped belt in its respective position to prevent a change in the position thereof, wherein the belt is always in engagement with at least one of the two pairs of grippers.

33. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, including a feed means for the reduced pressure arranged at least beneath the belt portion operable to carry the objects, means connecting the reduced pressure feed means to the reduced pressure source and to the openings in the belt and holding means thereby to cause the reduced pressure to act on the side towards the holding means of the object held thereby, wherein the feed means is subdivided into at least first and second portions of which at least one is arranged reciprocatably in the longitudinal direction of the belt, wherein the at least first and second portions are in overlapping relationship at their mutually associated end regions, the arrangement being such that a holding means in the overlap region is connected without interruption to the reduced pressure conduit of at least one of the portions of the feed means.

34. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, including a feed means for the reduced pressure arranged at least beneath the belt portion operable to carry the objects, means connecting the reduced pressure feed means to the reduced pressure source and to the openings in the belt and holding means thereby to cause the reduced pressure to act on the side towards the holding means of the object held thereby, wherein the reduced pressure feed means is flat and has a top side with groove-shaped recesses extending in parallel relationship with the transport direction of the belt and which are covered by the belt, further comprising means connecting the recesses to the reduced pressure source, and means connecting the respective opening in the belt in the region of the respective holding means to at least one of the groove-shaped recesses.

35. Apparatus for coating objects, comprising:

a plurality of object treatment stations;

at least one transport means defining a transport path for transport movement of the objects through the treatment stations; and a reduced pressure source;

wherein the transport means includes an endless flexible belt having an outer surface, means for circulation of the belt in a vertical plane, and at least one holding means at said outer surface of the belt for the objects to be coated, the at least one holding means being in the form of flexible portions of plastic material which are connected to the belt, and the belt and the at least one holding means comprising at least one opening connectable to the reduced pressure source, wherein the reduced pressure from said source is adapted to act on an object in the respective holding means, further including at least one marking on the belt for determining its position and the position of at least one object carried in operation thereby, at least one sensor for detecting said marking, means for comparing said detected marking to a reference position, and means operable in dependence on the result of the comparison to orient the relative position of at least one transport means with respect to at least one object on the belt.

36. Apparatus as set forth in claim 35, wherein the markings are in the form of apertures in the belt.

37. Apparatus as set forth in claim 35, wherein said means for effecting relative orientation of the belt comprise means for movement of the belt in the longitudinal direction of the belt in at least one of the transport direction and the opposite direction.

38. Apparatus as set forth in claim 35, wherein said means for effecting relative orientation of the belt comprise means for displacement of the at least one transport means relative to the belt transversely with respect to the longitudinal direction of the belt.

39. Apparatus as set forth in claim 35, including deflection drums for guiding the belt, and means for adjustment of at least one of the deflection drums in dependence on the result of the comparison thereby to influence the position of the belt transversely with respect to the transport direction thereof.

* * * * *